(12) United States Patent
Hoermann

(10) Patent No.: US 10,352,088 B2
(45) Date of Patent: Jul. 16, 2019

(54) METHOD OF TRANSFERRING SETTINGS OF A MOTOR-OPERATED DOOR SYSTEM

(71) Applicant: Marantec Antriebs—und Steuerungstechnik GmbH & Co. KG, Marienfeld (DE)

(72) Inventor: Michael Hoermann, Halle/Westf. (DE)

(73) Assignee: Marantec Antriebs- und Steuerungstechnik GmbH & Co. KG, Marienfeld (DE)

(*) Notice: Subject to any disclaimer, the term of this patent is extended or adjusted under 35 U.S.C. 154(b) by 128 days.

(21) Appl. No.: 15/695,740

(22) Filed: Sep. 5, 2017

(65) Prior Publication Data

US 2018/0106094 A1  Apr. 19, 2018

(30) Foreign Application Priority Data

Sep. 6, 2016 (DE) .................. 10 2016 010 753

(51) Int. Cl.
| | |
|---|---|
| *G06F 9/48* | (2006.01) |
| *H04W 4/00* | (2018.01) |
| *E05F 15/77* | (2015.01) |
| *G05B 11/36* | (2006.01) |
| *G06F 9/445* | (2018.01) |
| *G08C 17/02* | (2006.01) |

(52) U.S. Cl.
CPC ............ *E05F 15/77* (2015.01); *G05B 11/36* (2013.01); *G06F 9/445* (2013.01); *G06F 9/4862* (2013.01); *G08C 17/02* (2013.01); *H04W 4/00* (2013.01); *E05Y 2900/106* (2013.01); *E05Y 2900/132* (2013.01); *G08C 2201/20* (2013.01)

(58) Field of Classification Search
CPC ............. E05F 15/77; E05Y 2900/106; E05Y 2900/132; G05B 11/36; G06F 9/445; G06F 9/4862; G08C 17/02; G08C 2201/20; H04W 4/00
See application file for complete search history.

(56) References Cited

U.S. PATENT DOCUMENTS

| | | | | |
|---|---|---|---|---|
| 8,331,544 | B2 * | 12/2012 | Kraus | G07C 9/00944 340/5.7 |
| 9,122,254 | B2 * | 9/2015 | Cate | E05F 15/60 |
| 9,396,598 | B2 * | 7/2016 | Daniel-Wayman | G07C 9/00309 |
| 2007/0046231 | A1 * | 3/2007 | Mullet | G07C 9/00182 318/280 |

* cited by examiner

*Primary Examiner* — Omeed Alizada
(74) *Attorney, Agent, or Firm* — McCoy Russell LLP

(57) ABSTRACT

The present disclosure relates to a method of transferring settings of a motor-operated door system, wherein, in said method, at least one property of a door is transferred to a mobile end device, at least one property of a drive that drives the door is transferred to the mobile end device, settings for the combination of the properties of the door and the drive are requested from a database via the mobile end device, settings for the combination of the door and the drive are sent from the database to the mobile end device, and the settings received by the mobile end device are transferred to the drive of the door system.

18 Claims, 1 Drawing Sheet

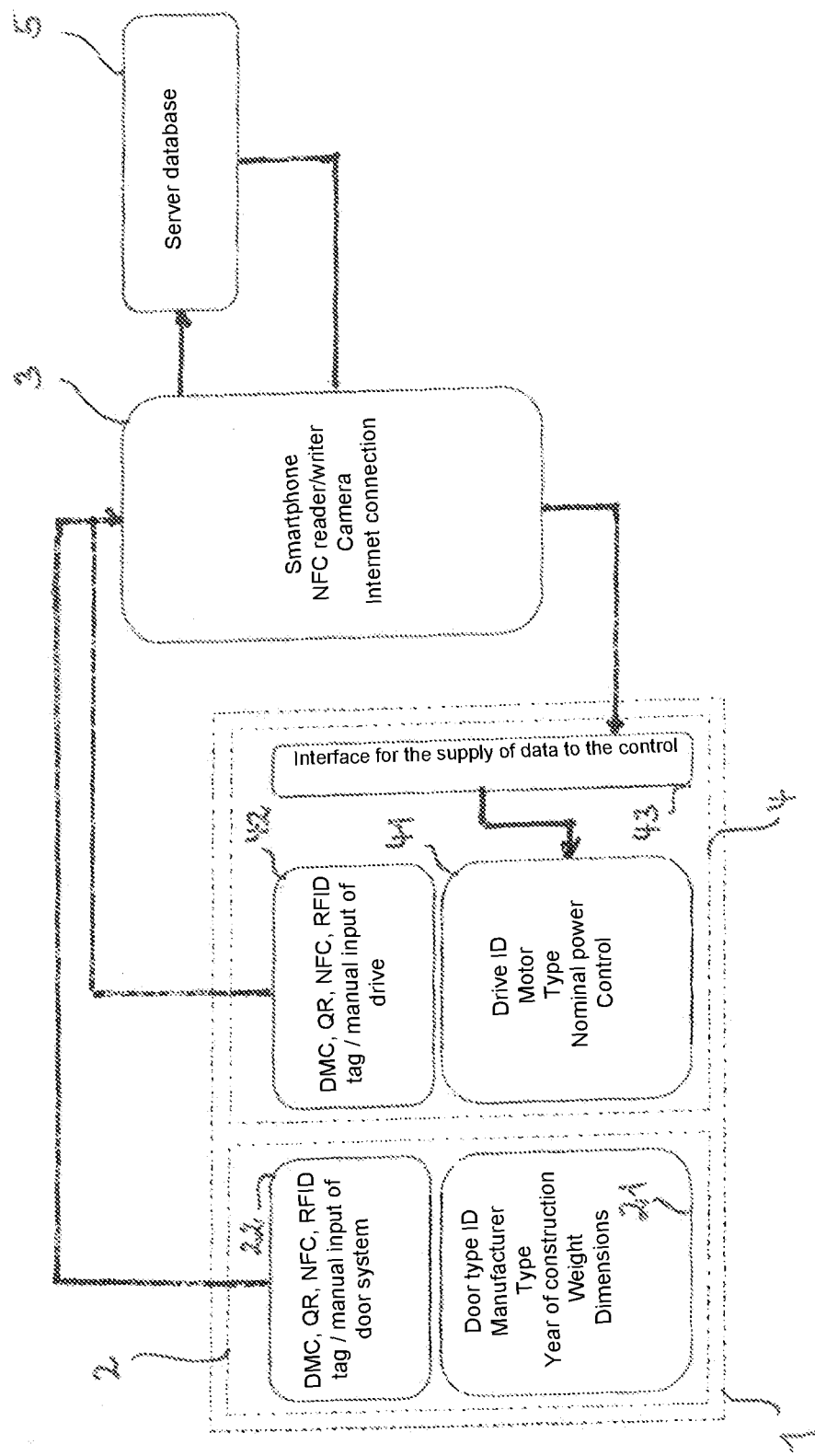

METHOD OF TRANSFERRING SETTINGS OF A MOTOR-OPERATED DOOR SYSTEM

CROSS REFERENCE TO RELATED APPLICATION

This application claims priority to German Patent Application No. 10 2016 010 753.7, entitled "Method of Transferring Settings of a Motor-Operated Door System," filed on Sep. 6, 2016, the entire contents of which is hereby incorporated by reference in its entirety for all purposes.

TECHNICAL FIELD

The present disclosure relates to a method of transferring settings of a motor-operated door system to a suitable door system.

BACKGROUND AND SUMMARY

Door drives are typically used to close or open doors. Door drives are particularly useful in doors where it is preferable that the doors do not to have to be manually closed or opened, such as garage doors. It is thus possible that all of the occupants of a vehicle can remain in the vehicle and that the door opens, the vehicle drives through, and the door closes. A typical use for a door drive is the use for a garage door or for an external door (garden door) in which the opening and closing of the garage door is carried out with the aid of the door drive, though there are a substantial number of different door types that can be automatically actuated in cooperation with a drive.

Reference can be made in this respect by way of example to the subassembly of garage doors to sectional doors, up and over doors, and tilt doors that can under certain circumstances be operated by one and the same drive, but require a drive control coordinated with the respective specific door type. As a result, it is thereby necessary to coordinate the control of a drive with the door to be operated by the drive.

To design a door drive such that it can operate as many door types as possible, the drive is typically provided with settings that enable combination with different door types. It is disadvantageous in these that a larger spectrum of door types can admittedly be operated with the drive, but the drive itself is not ideally configured for the specific door.

It is possible to overcome the disadvantages of the prior art using the method described herein.

In the method in accordance with one embodiment of transferring settings of a motor-operated door system, at least one property of a door and at least one property of a drive that drives the door are transferred to a mobile end device, with settings for the combination of the properties of the door and the drive being requested from a database via the mobile end device, with settings for the combination of the door and the drive being sent from the database to the mobile end device, and with the settings received by the mobile end device being transmitted to the drive of the door system.

It is thereby possible that a control matching the specific combination of door and drive is carried out by the drive and an ideal result is thus achieved with respect to the operation of the door and to the wear of the drive.

In accordance with another embodiment, the settings transferred to the drive of the door system replace or update a previous setting. The method can accordingly also be used to update already existing settings of the drive. It is thus possible, for example, to operate the door system with a drive that is configured for a plurality of specific doors and to update the settings of the drive used in this respect with the aid of the method in accordance with the present disclosure.

In accordance with a further embodiment, the settings transferred from the database to the mobile end device are checked by the mobile end device before a transfer to the drive of the door system to clarify whether the settings match the combination of door and drive. A verification can preferably be made as to whether the settings are original and/or are released by the manufacturer of the door system.

The risk is thereby minimized that settings not released by a manufacturer are installed on the drive, which can under certain circumstances result in damage to the drive and/or to the door; it must be noted that the compliance with standards is also canceled under certain circumstances.

In accordance with an embodiment, the transfer of the settings from the database to the mobile end device is carried out over the internet. Provision can be made in this respect that the manufacturer of the drive or the manufacturer of the door system has access to the database and load it with corresponding settings for a combination of door and drive.

In accordance with another embodiment, the transfer of the settings from the mobile end device to the drive is carried out via a wireless communication connection, in particular via a near field communication (NFC) connection. A connection by Bluetooth®, by wireless local area network (LAN) or by NFC can, for example, be understood as a wireless communication connection that serves to transfer the settings originating from the database from the mobile end device to the drive. Such a connection enables a reliable transfer possibility that is simple to handle for a user to transmit the settings to the drive.

In accordance with a further embodiment, the transferring of the at least one property of the door and/or of the drive is carried out with the aid of a wireless communication connection, in particular via radio frequency identification (RFID), NFC or a 2D code. The transfer of the properties of the door and/or of the drive to the mobile end device is necessary to request the specific settings for the door-drive combination from the database. In addition to the just listed possibilities of transmitting the properties to the mobile end device, the possibility can naturally also be provided to input the at least one property of the door and/or of the drive by a manual input into the mobile end device. As already stated above, it is to be preferred to carry out the awkward manual input with the aid of a communication connection via a camera of the mobile end device, for example by way of a 2D code such as a Quick Response (QR) code® or a DataMatrix code. It is also possible to transfer the transmission of the at least one property of the door and/or of the drive with the aid of an RFID tag or an NFC connection. The skilled person is aware that the mobile end device and the door or the drive have to have specific electronic components for such a transfer.

The at least one property of the door may be any desired property including, but not limited to, a code of the door, the door type, the door manufacturer, the year of construction, the weight, and/or the door dimensions. It is possible using one or more of these properties to specify the door with sufficient accuracy and to request settings matching the door-drive combination.

The at least one property of the drive may include any desirable property of the drive including, but not limited to, a code of the drive, the drive type, the nominal power and/or information on the kind of control of the drive. It is possible using this information to specify the drive with sufficient accuracy and to request a setting from the database that matches the combination of the door and the drive in association with the at least one property of the door and to install said setting on the drive.

The present disclosure further comprises a door system for carrying out a method in accordance with one of the preceding claims, wherein the door system comprises a drive and a door drivable by the drive.

In accordance with a further development, the drive is provided with an interface that is configured to receive data from a mobile end device. This interface can, include, but is not limited to, a Bluetooth® interface, an NFC interface or a wired interface for the mobile end device.

In accordance with a further preferred embodiment of the door system, the door and/or the drive has/have unidirectional or bidirectional communication means such as an RFID tag, an NFC element or a 2D code to be able to transfer data relating to at least one property of the door and/or drive to a mobile end device. A passive RFID or NFC element, that can be supplied with energy via the active counter-piece formed by the mobile end device, would be particularly advantageous here.

The present disclosure furthermore comprises a system for transferring settings of a motor-operated door system that has a door system in accordance with one of the above-defined variants, a mobile end device that is configured to set up a communication connection with the door system, and a database in which a plurality of settings for specific door systems are present. The mobile end device is furthermore configured to set up a data connection with the database to download settings for a specific door system.

The system allows the installation of settings that are specifically matched to the existing door system, that is the combination of door and drive. This allows new settings that have been added to the database by a manufacturer of the drive or of the door to be installed on the drive without any greater effort.

In a further embodiment, the door, the drive and the mobile end device have mutually couplable NFC elements so that the at least one property of the door and the at least one property of the drive are transferable to the mobile end device via an NFC connection and settings for a specific combination of door and drive are transferable from the mobile end device to the drive. The NFC technology is a particularly user-friendly technology that is becoming more and more widespread in mobile end devices. This technology is therefore suitable in the communication with the drive and/or the door.

The basic idea of the system in accordance with the present disclosure is that the communication between the database and the drive is conducted over the mobile end device so that it is not necessary for the drive itself to have an interface that can enter into communication with the database over a direct path. The provision of such an interface would, however, also not solve the above-stated problem since such an interface arranged at the drive is not aware of the properties of the door driven by the drive. The parameters relating to the properties of the door and to the properties of the drive required for a successful request of the settings of the drive are accordingly collected by the mobile end device and are used to request the corresponding settings while using the correct parameters in the database. As a result it is thus possible with much more accuracy to install specific settings directed to the combination of door and drive on the drive and to operate the drive in an optimum manner. An extended service life of the drive and of the total door system thereby results.

It is additionally possible that the drive or a control of the drive is used as a measuring means and data acquired therefrom are transmitted to a control center, the parameters required for the drive are determined in a complex process there and are sent back to the drive. The above-discussed embodiment is in particular of advantage for the case of a poor installation of the door that can result in an unusual behavior of the door on an operation by means of a motor.

A continuous monitoring and an ideal setting of the system is thereby possible. There are thereby no complex algorithms in the control of the drive that provide a setting of the system. The processor-intensive determination of the parameters required for the drive is rather carried out by a high-power processor that is arranged in the control center. The control in the drive can thereby be simplified, which results in a cost saving.

It is accordingly also possible with the aid of the present disclosure to describe or generate the database. The drive and the controls generate data and values (the drive and the control can in this case be considered measurement units) that are supplied to the database. The database can then process the values (e.g. operating values of a drive) itself or with the aid of further devices and can provide improved settings by conclusions drawn therefrom for the drive or for the specific drive-door combination. The data to be supplied to the database have preferably been processed via a gateway, i.e. a network node equipped for interfacing with another network that uses different communication protocols, beforehand.

A system is thus obtained that optimizes itself by empirical values and that produces optimum setting parameters by the generation and processing of measured values.

Accordingly, no complex algorithms or complex calculations are required in the control since only data, preferably measurement data, are picked up from the running operation. They are then sent to the server that provides optimum setting parameters on the basis of these data.

Further details, features and advantages of the present disclosure will become evident with reference to the description of the only FIGURE.

BRIEF DESCRIPTION OF THE FIGURE

FIG. 1 shows the schematic set-up of a system for transferring settings of a motor-operated door system.

DETAILED DESCRIPTION

The door system 1 in FIG. 1 comprises a door 2 and a drive 4 with which the door 2 is driven.

A mobile end device 3 is in this respect in communication with a unidirectional communication means 22 of the door 2 and with a unidirectional communication means 42 of the drive 4. The end device 3 is furthermore in communication with a database 5, with this connection preferably running over the internet. An interface 43 is also connectable to the mobile end device 3 so that data from the mobile end device 3 can be installed on the drive 4 via the interface 43. The communication means 22, 42 of the door 2 and of the drive 4 are able to transmit at least one property 21, 41 to the mobile end device 3. The property of the door 21 can in this respect comprise a code of the door type, the manufacturer, the type of the door, the year of construction, the weight of the door and/or the door dimensions. In the drive 4, the properties 41 can comprise a code of the drive, the motor type, a nominal power and/or information on the control.

In accordance with the method in accordance with the present disclosure for transferring settings of a motor-operated door system, a property 21, 41 of the door 2 and of the drive 4 is transferred to the mobile end device 3 with the aid of the communication means 22, 42. The mobile end device 3 then sends a request to the database 5 to obtain suitable settings for the drive 4 for the specific combination of door 2 and drive 4. As already stated above, there are a number of different doors and drives so that the installation of a motor control or settings for the drive suitable for the combination of door 2 and drive 4 can only be carried out when the door communicating with the drive is determined. A different control behavior of the drive is, for example, necessary for a sectional door or for a tilt door to achieve ideal results in the operation of the door 2.

After the database 5 has transmitted the corresponding settings for the specific combination of door 2 and drive 4 to the mobile end device 3, they are transmitted via a communication connection to an interface 43 that is in communication with the drive 4. If the drive 4 receives settings of the mobile end device 3, it takes these settings and replaces its previous settings with them. It is thereby possible that the settings of the drive 4 are specifically oriented to the combination of the door 2 and the drive 4.

The skilled person is aware that the input of the at least one property of the door 2 and/or of the drive 4 can also take place manually via an input means of the mobile end device 3.

It is, however, more advantageous if the communication means 22, 42 is a two-dimensional code that can be recorded by means of the camera of the mobile end device 3 and that thus transmits the corresponding properties 21, 41 to the mobile end device 3. An RFID tag or an NFC connection can also be provided between the drive 4 and/or the door 2 and the mobile end device 3 as a further advantageous embodiment.

The invention claimed is:

1. A method of transferring settings of a motor-operated door system comprising:
   transferring at least one property of a door to a mobile end device;
   transferring at least one property of a drive that drives the door to the mobile end device;
   requesting settings from a database for a combination of the properties of the door and the drive via the mobile end device;
   sending settings for the combination of the door and drive from the database to the mobile end device; and
   transferring the settings received by the mobile end device to the drive of the door system;
   wherein the settings transferred from the database to the mobile end device are checked by the mobile end device as to whether the settings match the combination of the door and the drive before a transfer to the drive of the door system.

2. The method in accordance with claim 1, wherein the settings transferred to the drive of the door system replace or update previous settings of the drive.

3. The method in accordance with claim 1, wherein a verification is made as to whether the settings are original and/or have been released by a manufacturer of the door system.

4. The method in accordance with claim 1, wherein the transfer of the settings from the database to the mobile end device is carried out over an internet.

5. The method in accordance with claim 1, wherein the sending of the settings from the mobile end device to the drive is carried out via a wireless communication connection, in particular an NFC connection.

6. The method in accordance with claim 1, wherein the transfer of the at least one property of the door is carried out with the aid of a wireless communication connection; and wherein the wireless communication connection is a RFID, a NFC, or a 2D code.

7. The method in accordance with claim 1, wherein the transfer of the at least one property of the drive is carried out with the aid of a wireless communication connection; and wherein the wireless communication connection is a RFID, a NFC, or a 2D code.

8. The method in accordance with claim 1, wherein the at least one property of the door comprises a code of the door, a door type, a door manufacturer, a year of construction, a weight and/or door dimensions.

9. The method in accordance with claim 1, wherein the at least one property of the drive comprises a code of the drive, a drive type, a nominal power and/or information on a kind of control of the drive.

10. The door system for carrying out the method in accordance with claim 1, comprising a drive and a door drivable by the drive.

11. The method in accordance with claim 9, wherein the drive is provided with an interface that is configured to receive data from a mobile end device.

12. The method in accordance with claim 1, wherein the door has a unidirectional or bidirectional communication means;
   wherein the unidirectional or bidirectional communication means is a RFID tag, a NFC element, or a 2D code; and
   wherein the unidirectional or bidirectional communication means is able to transfer data relating to at least one property of the door to the mobile end device.

13. The method in accordance with claim 1, wherein the drive has a unidirectional or bidirectional communication means;
   wherein the unidirectional or bidirectional communication means is a RFID tag, a NFC element, or a 2D code; and
   wherein the unidirectional or bidirectional communication means is able to transfer data relating to at least one property of the drive to a mobile end device.

14. A system for transferring settings of a motor-operated door system, comprising:
   a door system comprising a drive with at least one property and a door with at least one property drivable by the drive;
   a mobile end device that is configured to set up a communication connection to the door system and receive the at least one property of the door and the at least one property of the drive; and
   a database in which a plurality of settings for specific door systems are stored, wherein
   the mobile end device is configured to set up a data connection to the database to download settings for a specific door system, wherein the settings for a specific door system comprise a combination of the at least one property of the door and the at least one property of the drive;
   and
   wherein the mobile end device is configured to verify that the settings match the door system and then transfer the verified settings to the drive of the door system.

15. The method in accordance with claim 12, wherein the door, the drive, and the mobile end device have mutually couplable NFC elements so that the at least one property of the door and the at least one property of the drive are transferable to the mobile end device via an NFC connection and settings for a specific combination of the door and the drive are transferable from the mobile end device to the drive.

16. The method of claim 1, wherein, in said method:
at least one operating value of the drive that drives the door or a control of the drive is transferred to the database;
settings are generated or stored in the database using the at least one operating value; and
settings for the drive are transferred from the database to the drive of the door system.

17. The method in accordance with claim 16, wherein the settings that are produced using the at least one operating value are generated by processor connected to the database.

18. The method in accordance with claim 17, wherein the at least one operating value to be transferred to the database is processed via a gateway and is transmitted from the gateway to the database.

\* \* \* \* \*